United States Patent
Ota et al.

(10) Patent No.: US 8,925,563 B2
(45) Date of Patent: Jan. 6, 2015

(54) ROBOTIC CANE DEVICES

(71) Applicant: Toyota Motor Engineering & Manufacturing North America, Inc., Erlanger, KY (US)

(72) Inventors: Yasuhiro Ota, Union, KY (US); Masaru Ryumae, Union, KY (US); Keiichi Sato, Chicago, IL (US); Shin Sano, Oak Park, IL (US)

(73) Assignees: Toyota Motor Engineering & Manufacturing North America, Inc., Erlanger, KY (US); Illinois Institute of Technology, Chicago, IL (US)

( * ) Notice: Subject to any disclaimer, the term of this patent is extended or adjusted under 35 U.S.C. 154(b) by 0 days.

(21) Appl. No.: 13/644,392

(22) Filed: Oct. 4, 2012

(65) Prior Publication Data
US 2013/0041507 A1 Feb. 14, 2013

Related U.S. Application Data

(63) Continuation of application No. 12/847,410, filed on Jul. 30, 2010, now Pat. No. 8,418,705.

(51) Int. Cl.
| | |
|---|---|
| A45B 1/02 | (2006.01) |
| A61H 3/02 | (2006.01) |
| G05B 15/00 | (2006.01) |
| G05B 19/00 | (2006.01) |
| A61H 3/04 | (2006.01) |

(52) U.S. Cl.
CPC .......... *A61H 3/04* (2013.01); *A61H 2003/0272* (2013.01); *A61H 2003/043* (2013.01); *A61H 2201/5061* (2013.01); *A61H 2201/5069* (2013.01); *Y10S 901/09* (2013.01)
USPC .................. 135/85; 135/72; 901/9; 700/258

(58) Field of Classification Search
CPC ............ A61H 3/04; A61H 2201/5061; A61H 2201/5069; A61H 2003/043; A61H 2003/0272
USPC ........... 700/12–13, 245, 250, 258; 318/568.1, 318/568.25; 901/1, 9–10, 46, 50; 135/65–68, 71–73, 77, 85
See application file for complete search history.

(56) References Cited

U.S. PATENT DOCUMENTS

| | | | |
|---|---|---|---|
| 2,707,963 | A | 9/1954 | Goynes |
| 4,958,651 | A | 9/1990 | Najm |

(Continued)

OTHER PUBLICATIONS

Morris et al, "A Robotic Walter that Provides Guidance", Sep. 23, 2006.*

(Continued)

*Primary Examiner* — Khoi Tran
*Assistant Examiner* — Abby Lin
(74) *Attorney, Agent, or Firm* — Dinsmore & Shohl LLP

(57) ABSTRACT

A robotic cane may include a grip handle, a cane body extending from the grip handle at a first end, a motorized omni-directional wheel coupled to a second end of the cane body, a balance control sensor, and a controller module. The balance control sensor provides a balance signal corresponding to an orientation of the robotic cane. The controller module may receive the balance signal from the balance control sensor and calculate a balancing velocity of the motorized omni-directional wheel based at least in part on the balance signal and an inverted pendulum control algorithm. The controller module may further provide a drive signal to the motorized omni-directional wheel in accordance with the calculated balancing velocity. The calculated balancing velocity is a speed and direction of the motorized omni-directional wheel to retain the robotic cane in an substantially upright position.

20 Claims, 7 Drawing Sheets

(56) References Cited

U.S. PATENT DOCUMENTS

| | | | |
|---|---|---|---|
| 5,097,856 | A | 3/1992 | Chi-Sheng |
| 5,653,468 | A | 8/1997 | Ostapyk |
| 5,687,136 | A | 11/1997 | Borenstein |
| 5,823,845 | A | 10/1998 | O'Berrigan |
| 5,938,240 | A | 8/1999 | Gairdner |
| 5,973,618 | A | 10/1999 | Ellis |
| 6,668,846 | B2 | 12/2003 | Meador |
| 6,708,705 | B2 | 3/2004 | Nasco, Sr. |
| 7,140,631 | B2 * | 11/2006 | Ridley .......................... 280/301 |
| 7,370,713 | B1 | 5/2008 | Kamen |
| 7,526,212 | B2 * | 4/2009 | Zwiefelhofer ................... 399/8 |
| 2001/0032743 | A1 | 10/2001 | Kamen et al. |
| 2006/0070646 | A1 | 4/2006 | Denman |
| 2006/0162754 | A1 | 7/2006 | Karasin et al. |
| 2008/0191864 | A1 * | 8/2008 | Wolfson ......................... 340/524 |
| 2008/0289670 | A1 * | 11/2008 | Ashihara et al. ................ 135/65 |
| 2009/0045021 | A1 * | 2/2009 | Einbinder ..................... 188/2 D |
| 2009/0265106 | A1 * | 10/2009 | Bearman et al. .............. 701/300 |
| 2010/0100013 | A1 * | 4/2010 | Hu et al. ....................... 600/595 |
| 2010/0174567 | A1 * | 7/2010 | King et al. ....................... 705/5 |

OTHER PUBLICATIONS

Smart Suitcase Follows Its Owner, Trendhunter Unique, Nov. 12, 2007.*

Morris et al, "A Robotic Walker that Provides Guidance", Sep. 23, 2006.*

Honda's self balancing U3-X on show, Gizmag.com, Apr. 6, 2010.*

Honda News Release Sep. 24, 2009 (http://world.honda.com/news/2009/c090924New-Personal-Mobility-Device/).

* cited by examiner

ROBOTIC CANE DEVICES

CROSS-REFERENCE TO RELATED APPLICATIONS

This application is a continuation of U.S. patent application Ser. No. 12/847,410, filed on Jul. 30, 2010 and entitled "Robotic Cane Devices."

TECHNICAL FIELD

The present specification generally relates to user assistive devices for physically assisting persons and, more specifically, robotic canes for assisting users to walk and stand in an upright position.

BACKGROUND

Injured, elderly and disabled persons may have difficulty standing or walking without physical assistance. In many cases, these individuals rely on assistive devices such as single-legged canes, four-legged canes, walkers, and wheel chairs. Assistive devices provide support for users so that they may stand or walk. Motorized devices, such as motorized wheel chairs and user transportation devices, may enable the user to travel from point A to point B with minimal effort by the user. However, these devices do not provide any rehabilitation aspects or feelings of independence to the user. For example, a user having a mild to moderate impairment in the lower extremity may benefit from rehabilitation motions that are used to relearn how to walk or stand. A person who simply rides on or in such a motorized device may not benefit from rehabilitation motions or procedures when attempting to walk or stand while totally depending on assistance. Further, in many cases the user may wish to independently stand or walk a distance and only minimally rely on an assistive device.

Accordingly, a need exists for alternative assistive devices for actively providing physical assistance in aiding a person to walk and/or stand in an upright position.

SUMMARY

In one embodiment, a robotic cane may include a grip handle, a cane body extending from the grip handle at a first end of the cane body, a motorized omni-directional wheel coupled to a second end of the cane body, a balance control sensor, and a controller module. The balance control sensor provides a balance signal corresponding to an orientation of the robotic cane. The controller module receives the balance signal from the balance control sensor and calculates a balancing velocity of the motorized omni-directional wheel based at least in part on the balance signal and an inverted pendulum control algorithm. The controller module also provides a drive signal to the motorized omni-directional wheel in accordance with the calculated balancing velocity. The calculated balancing velocity relates to a speed and direction of the motorized omni-directional wheel to retain the robotic cane in a substantially upright position.

In another embodiment, a robotic cane may include a grip handle, a cane body extending from the grip handle at a first end of the cane body, a motorized wheel assembly having at least one wheel coupled to a second end of the cane body, a proximity detector, and a controller module. The proximity detector may provide a proximity signal corresponding to a position of a user with respect to the robotic cane. The controller module receives the proximity signal from the proximity detector, calculates a distance of the robotic cane from the user based at least in part on the proximity signal, and provides a drive signal to the motorized wheel assembly such that the robotic cane follows the user at a predetermined distance during a user tracking mode.

In yet another embodiment, a robotic cane may include a grip handle, a cane body extending from the grip handle at a first end of the cane body, a motorized omni-directional wheel coupled to a second end of the cane body, a balance control sensor, a grip force sensor associated with the grip handle, and a controller module. The balance control sensor may provide a balance signal corresponding to an orientation of the robotic cane and the grip force sensor may provide a grip force signal to the controller module in accordance with a grip force value applied to the grip handle. The controller module may receive the balance signal from the balance control sensor and monitor an orientation angle of the robotic cane based at least in part on the balance signal provided by the balance control sensor. The controller may compare the orientation angle of the robotic cane with a threshold angle, receive the grip force signal from the grip force sensor and compare the grip force value to a grip force threshold. A fall prevention drive signal may be provided to the motorized omni-directional wheel by the controller module during a fall prevention mode in accordance with a feed-forward control loop of an inverted pendulum control algorithm if the grip force value exceeds the grip force threshold such that the motorized omni-directional wheel provides a counter force that is opposite from a user weight projection indicated by the balance control sensor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
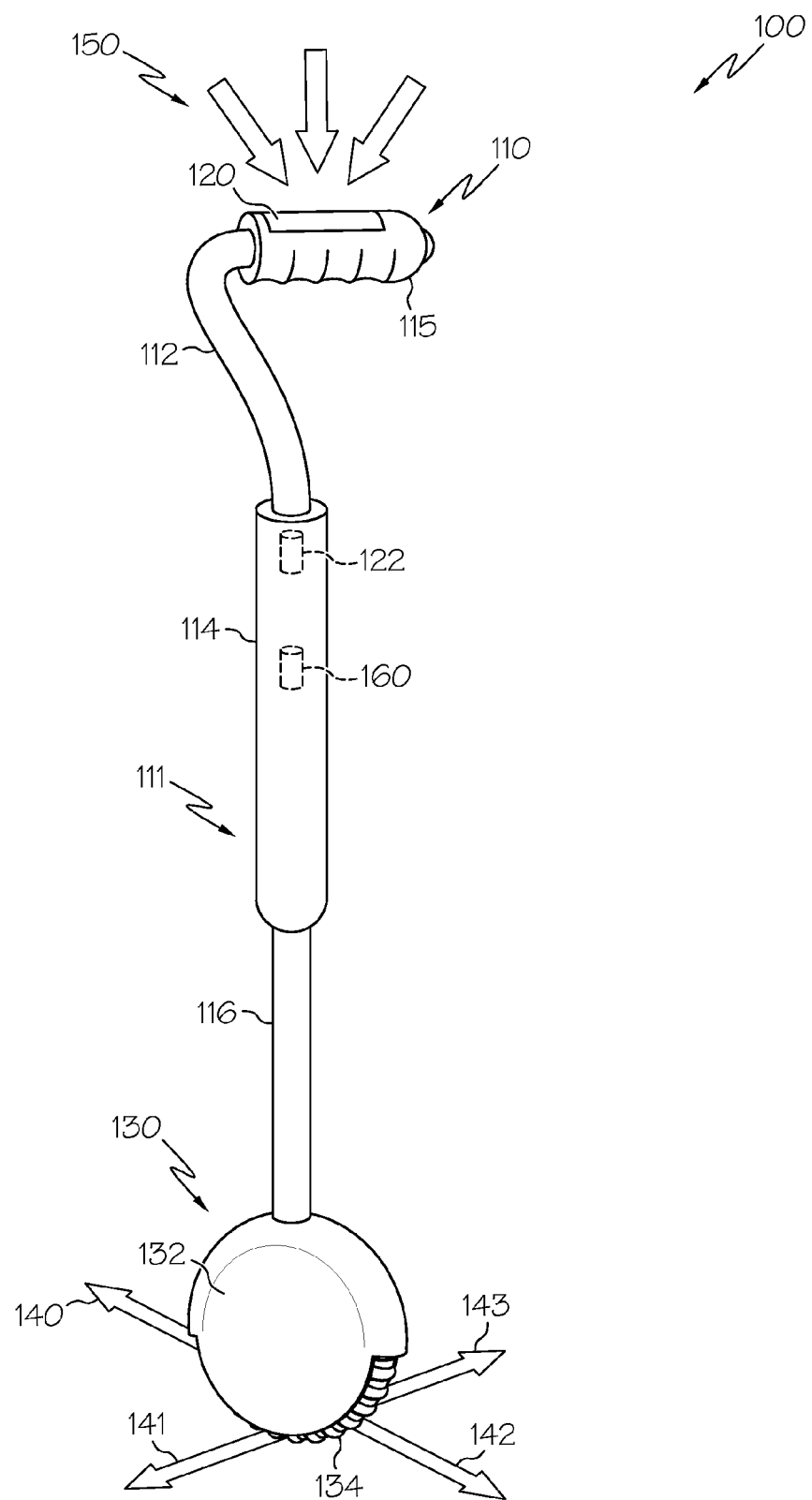
FIG. 1 depicts a robotic cane in an upright position according to one or more embodiments shown and described herein.

FIG. 1 generally depicts one embodiment of a robotic cane for assisting a user to walk or stand. The robotic cane generally comprises a grip handle, a cane body, a motorized wheel assembly and a controller module. The robotic cane may further comprise a balance control sensor, and the motorized wheel assembly may comprise a single omni-directional wheel. Various embodiments of the robotic cane and the operation of the robotic cane will be described in more detail herein.

Referring now to FIG. 1, one embodiment of a robotic cane 100 is illustrated. The cane generally comprises a motorized wheel assembly 130 having an omni-directional wheel 134 that is mechanically coupled to a cane body 111. The cane body 111 terminates in an angled grip handle 110. A user may grasp the grip handle 110 and use the robotic cane to support his or her weight while walking or standing.

Figure 2:
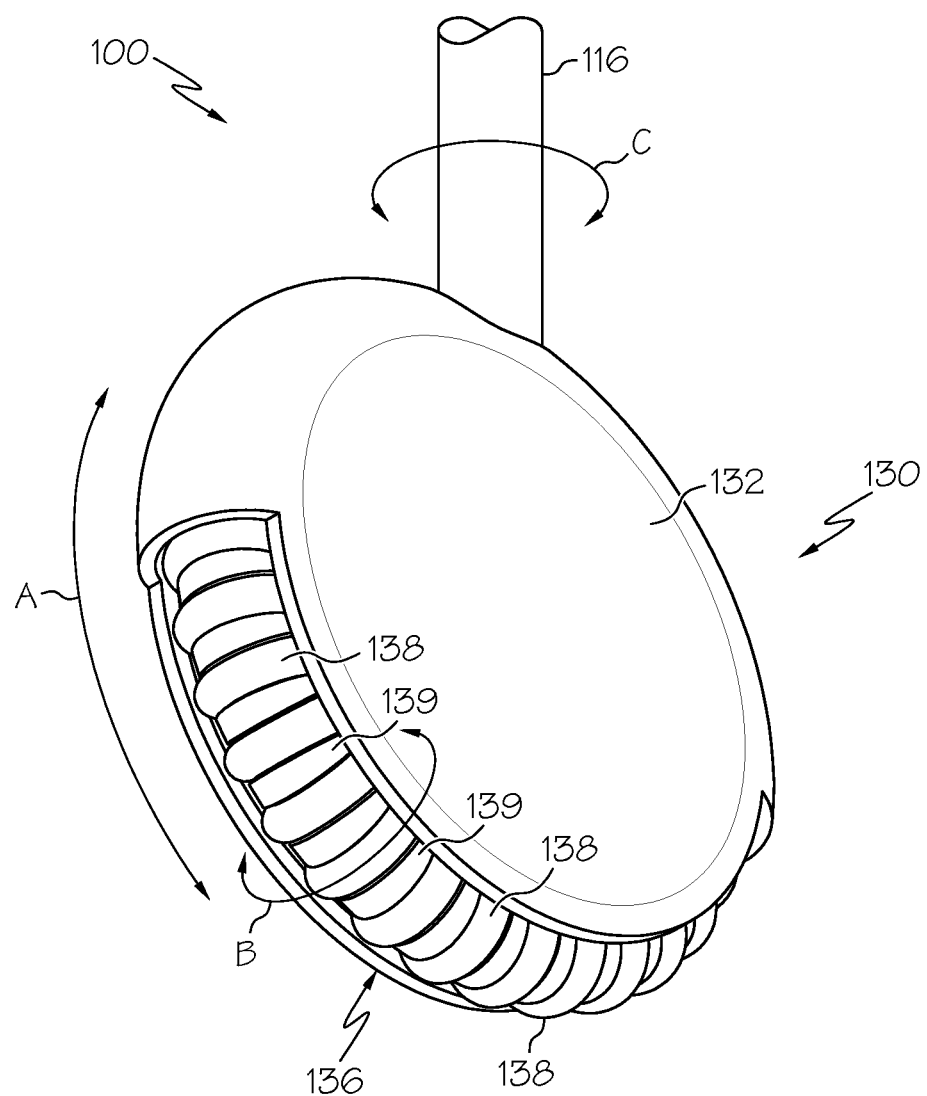
FIG. 2 depicts a motorized wheel assembly having an omni-directional wheel according to one or more embodiments shown and described herein.

FIG. 2 illustrates the motorized wheel assembly 130 comprising the omni-directional wheel 134 depicted in FIG. 1. Although embodiments may be described herein in the context of motorized wheel assemblies having a single omni-directional wheel, embodiments are not limited thereto. The motorized wheel assembly may have any number of wheels that may be used to support and aid the user. For example, the robotic cane may have three or four motorized wheels such that the robotic cane may remain in an upright position without the inverted pendulum control, as described below with reference to the omni-directional wheel.

Referring to FIGS. 1 and 2, the motorized wheel assembly 130 may comprise a motorized omni-directional wheel 134 that is disposed within a wheel housing 132 having an opening 136 through which the omni-directional wheel 134 may contact a supporting surface such as a floor. The wheel housing 132 may be made of a metal material such as stainless steel or aluminum, for example, or a molded plastic material. The motorized omni-directional wheel 134 may be configured as a wheel 139 around a circumference of which a plurality of motorized roller elements 138 are positioned. The wheel 139 may be made of metal or a rigid plastic material. Referring to both FIGS. 1 and 2, the wheel 139 may be rotated in an angular direction depicted by arrow A by the application of one or more drive signals 163 (see FIGS. 5 and 6) to a drive motor (not shown). The rotation of the wheel 139 in the angular direction A causes the robotic cane 100 to travel in directions 140 and 142 as shown in FIG. 1.

Each of the plurality of roller elements 138 may be rotated in an angular direction as depicted by arrow B. The roller elements 138 may be individually or cooperatively rotated. The angular direction of rotation of each roller element 138 is perpendicular to the angular direction of rotation of the wheel 139. In one embodiment, each roller element 138 is mechanically coupled to an individual roller element motor (not shown) that may be actuated with the application of a drive signal to initiate rotation of the roller element 138. The rotation of the roller elements 138 may enable the robotic cane to travel in directions 141 and 143, which are perpendicular to directions 140 and 142 provided by the rotation of the wheel 139. The roller elements may have an exterior portion made of a rubber material or other similar material that provide increased friction between the omni-directional wheel 134 and the support surface.

As described in more detail below, drive signals 163 may be provided to the motorized omni-directional wheel 134 such that the rotation of the wheel 139 and roller elements 138 cooperatively rotate to enable the robotic cane 100 to travel in a plurality of directions such that the robotic cane 100 may move in accordance with a user's intended direction of travel, as well as move to retain its balance using an inverted balance control. Other omni-directional wheel configurations and controls may also be incorporated into the motorized wheel assembly 130, and embodiments are not limited to the omni-directional wheel illustrated in FIGS. 1-3. In one embodiment, the motorized wheel assembly 130 may be rotatably coupled to the cane body 111 such that the wheel 139 may be controllably rotated in a direction as indicated by arrow C in combination with or in lieu of the rotation of roller elements 138 to provide omni-directional functionality. In this embodiment, the motorized wheel assembly 130 may turn in the direction of the intended direction of travel of the user.

Referring again to FIG. 1, the motorized wheel assembly 130 is coupled to the cane body 111. The cane body 111 may be integral with the wheel housing 132 as one component (e.g., the cane body 111 and wheel housing 132 may be molded as one component) or as separate components that are mechanically coupled together by fasteners. The cane body 111 may be made of a lightweight metal or plastic. As described above, the motorized wheel assembly 130 may also be rotatably coupled to the cane body 111 such that the motorized wheel assembly 130 may rotate with respect to the cane body 111. In the illustrated embodiment, the cane body 111 comprises a lower section 116 that is coupled to the motorized wheel assembly 130, a middle section 114, and an upper section 112 that is curved and angled such that a grip handle 110 is substantially perpendicular to a support surface when the robotic cane 100 is in a substantially vertical orientation. Although the robotic cane 100 is illustrated as having a three-section cane body, embodiments are not limited thereto. Embodiments may comprise a cane body 111 having a single section, for example. In one embodiment, the middle section 114 may be slidably coupled to the lower section 116 such that a height of the robotic cane 100 may be adjusted by translating the middle section 114 along the lower section 116.

The cane body 111 may house various electronic components, such as a balance control sensor 122 and a controller module 160. As described in more detail below, the balance control sensor 122 and controller module 160 may cooperate to generate drive signals that are applied to the motorized omni-directional wheel such that the robotic cane may retain its balance in a substantially vertical orientation, support at least a portion of a user's weight, and move in a direction in accordance with a user's intended direction of travel.

The grip handle 110 may comprise a grip force sensor 120 and may be integral with the upper section 112 of the cane body 111 or a separate component. In one embodiment, the grip handle 110 has a cylindrically-shaped rubber (or other similar material) grip 115 that surrounds an end of the upper portion 112 of the cane body 111. Any number of grip handle configurations may be utilized.

The grip force sensor 120 may be a force-sensitive tactile sensor positioned at any location on the grip handle 110 that detects an amount of gripping force that is applied to the grip handle 110 by the user. For example, the grip force sensor 120 may produce grip force signal 121 (see FIG. 5) in the form of an analog voltage signal, wherein an increased voltage signal is produced when an increased gripping force is applied to the grip handle 110 by the user. Conversely, a lower voltage signal may be produced by the grip force sensor 120 when a lower gripping force is present. The grip force sensor 120 may also produce a digital grip force signal 121 that is indicative of the level of gripping force applied to the grip handle. As described below, the grip force sensor 120 is communicably coupled to the controller module 160 such that the controller module 160 may receive the grip force signal 121 from the grip force sensor 120.

Figure 3:
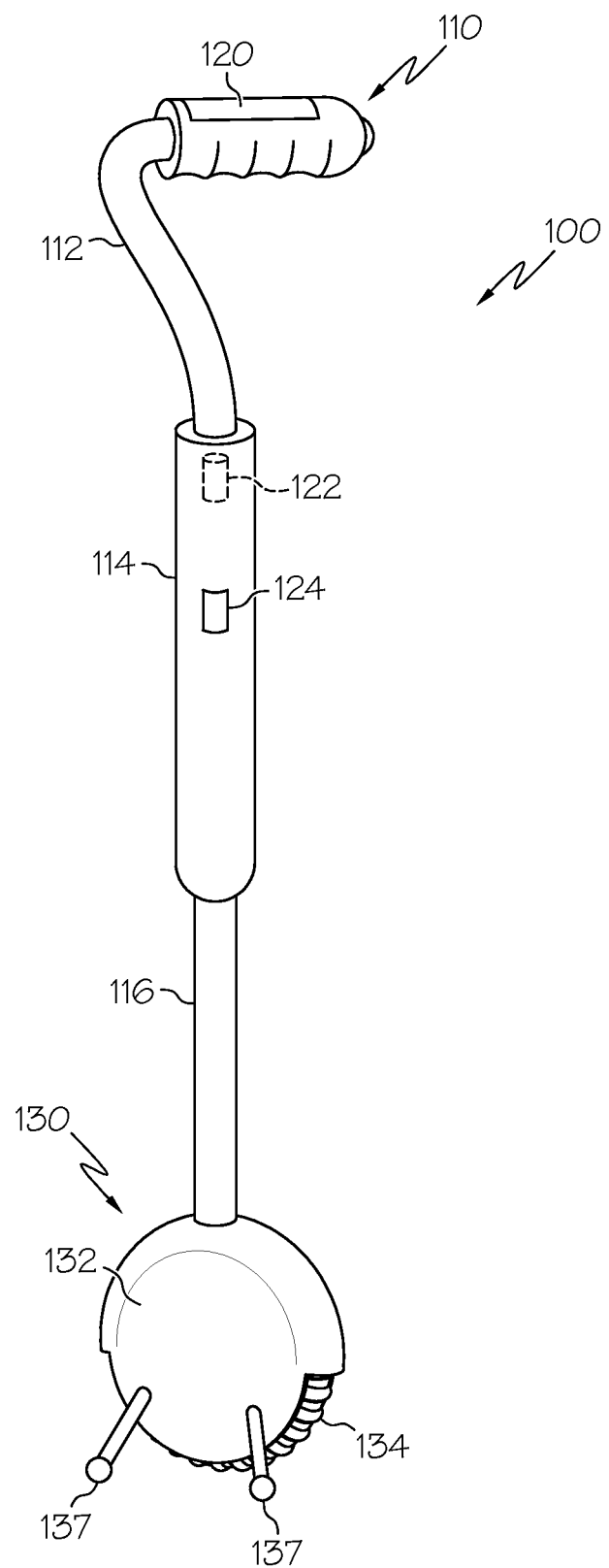
FIG. 3 depicts a robotic cane in an upright position having retractable auxiliary supports in a deployed position according to one or more embodiments shown and described herein.

Referring to FIG. 3, a robotic cane 100 comprising a motorized wheel assembly 130 having a single motorized omni-directional wheel 134 further comprises retractable auxiliary supports 137 that aid in maintaining the robotic cane in a vertical orientation when the robotic cane is in a power-off mode (i.e., a support mode). The auxiliary supports 136 may include a wheel or stopper that engages the support surface such that the robotic cane 100 does not fall over when the inverted pendulum control is inactive or the robotic cane is not powered on. The auxiliary supports 137 may be maintained within the wheel housing 132 and automatically deployed when the power is turned off or during an emergency situation. In one embodiment, the auxiliary supports 137 may be folded into the wheel housing 132 during operation of the robotic cane 100 and then pivot away from the wheel housing 132 toward the support surface when the robotic cane is powered down. FIG. 1 illustrates a robotic cane having auxiliary supports in a retracted position within the wheel housing.

Figure 5:
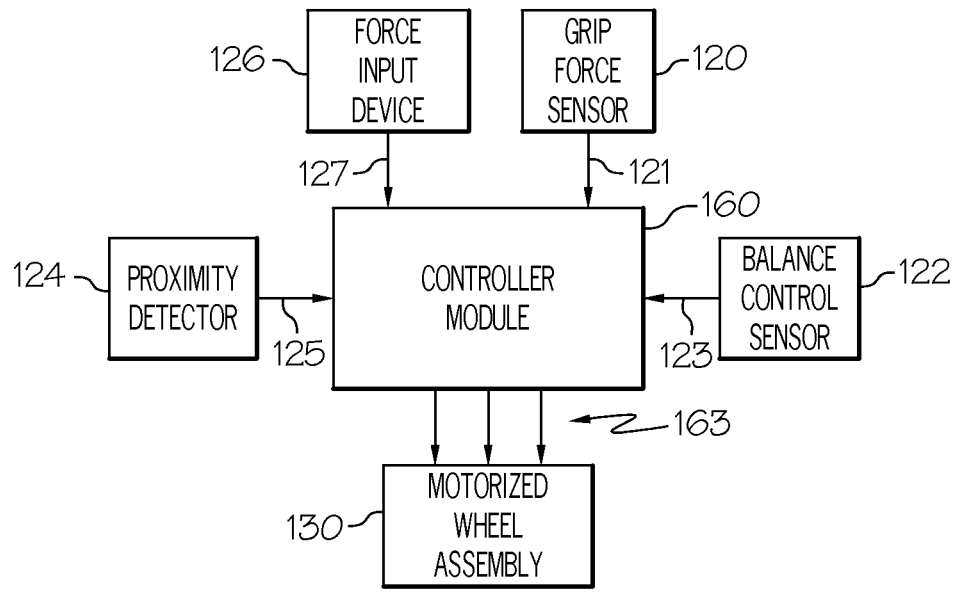
FIG. 5 depicts a schematic illustration of a robotic cane electrical control system according to one or more embodiments shown and described herein.
Figure 6:
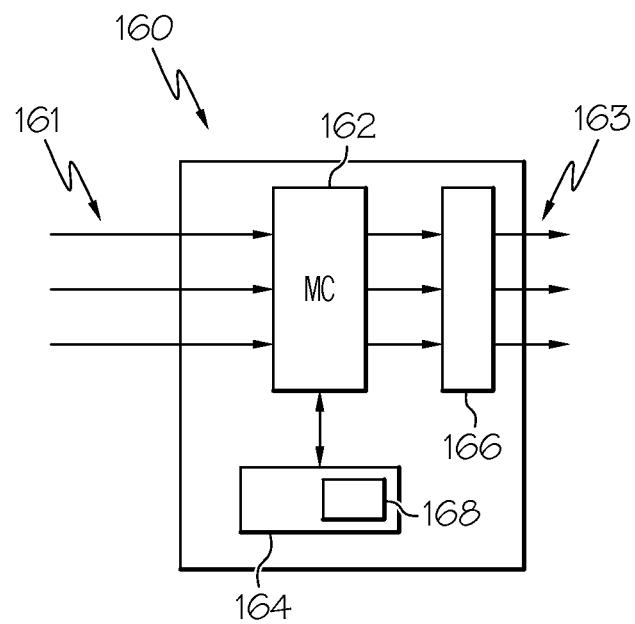
FIG. 6 depicts a schematic illustration of a controller module of a robotic cane according to one or more embodiments shown and described herein.

The motorized wheel assembly 130 may be controlled by the application of one or more drive signals produced and provided by a controller module 160. FIG. 5 illustrates a schematic of an exemplary robotic cane electrical control system, while FIG. 6 illustrates a schematic of an exemplary controller module 160. Referring to both FIGS. 5 and 6, the controller module 160 may comprise a microcontroller 162, memory 164, and drive signal electronics 166. The controller module 160 may include other components that are not shown, such as input signal conditioning circuits to prepare the input signals 161 prior to being received at the microcontroller 162, an analog to digital converter for converting analog input signals 161 into digital signals, etc. In some embodiments, the microcontroller 162 may comprise integrated analog-to-digital and digital-to-analog converters.

The input signals 161 may include input signals provided by the various sensors. For example, the controller module illustrated in FIG. 5 receives a grip force signal 121 from a grip force sensor, a balance signal 123 from a balance control sensor 122, a force signal 127 from a force sensor 126, and a proximity signal 125 from a proximity detector 124. The various input signals are referred to generally as input signals 161 in FIG. 6. The microcontroller 162 receives these input signals 161 to determine how to instruct the motorized wheel assembly 130 to rotate. The memory 164 is operable to store computer readable instructions 168 that, when read and executed by the microcontroller 162, cause the controller module to produce the drive signals 163 that are provided to the motorized wheel assembly 130. In embodiments that utilize a single motorized omni-directional wheel 134, the set of executable instructions 168 may include an inverted pendulum control algorithm that calculates a balancing velocity of the motorized omni-directional wheel that is based on the balance signal 123.

The drive signal electronics 166 may be provided to receive signals from the microcontroller 162 and produce drive signals 163 that are sent to the motorized wheel assembly 130 to control the motion and balance control of the robotic cane 100. The drive signal electronics 166 may include transistors or other switching devices that are configured to output voltage or current in accordance with instructions from the microcontroller 162. The drive signal or signals 163 provided to motorized wheel assembly 130 may depend on the particular type and configuration of motorized wheel assembly. In another embodiment, the drive control electronics 166 may further comprise digital-to-analog converters operable to translate digital signals provided by the microcontroller 162 into analog signals to produce analog drive signals 163 that are provided to the motorized wheel assembly 130.

Figure 4:
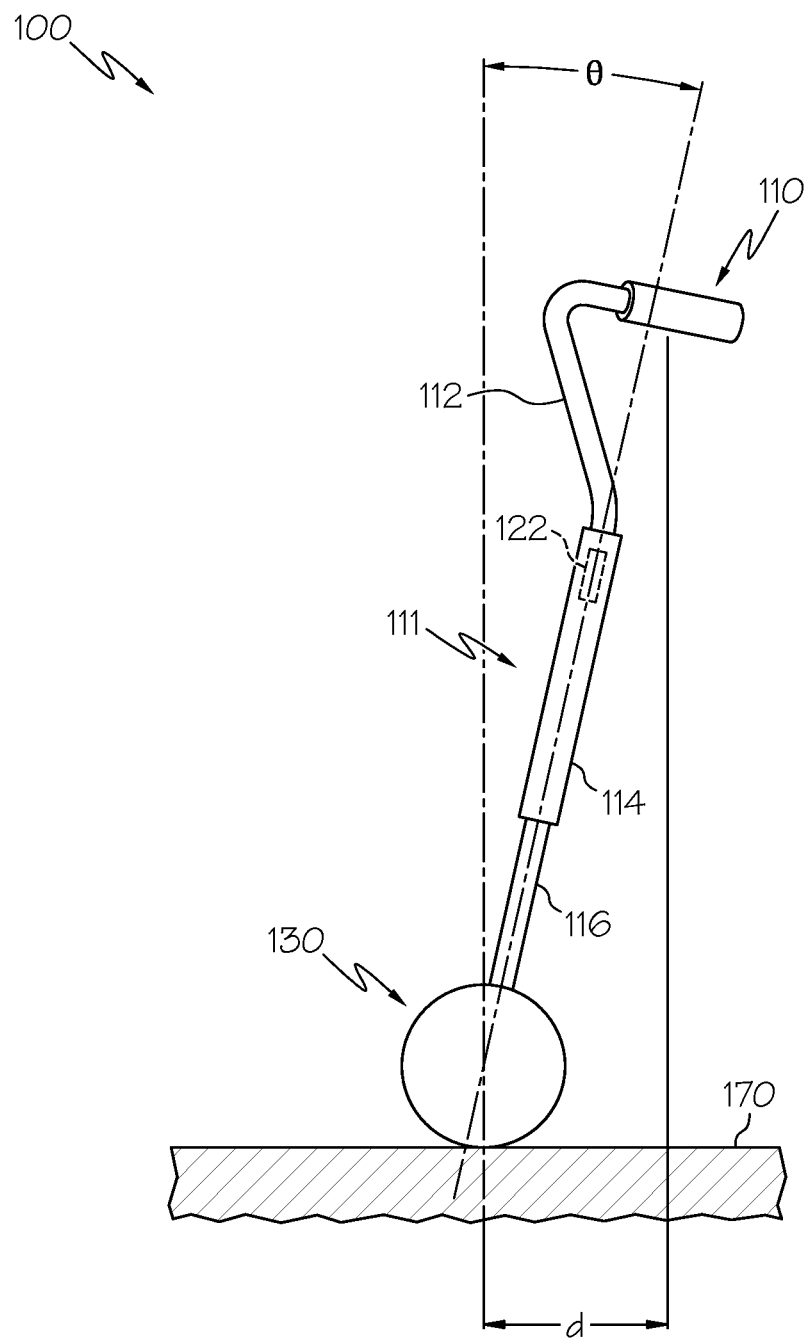
FIG. 4 depicts a side view of a robotic cane in an angled orientation according to one or more embodiments shown and described herein.

Referring now to FIG. 4, the balance control sensor 122 determines an orientation and movement of the robotic cane 100. The balance control sensor 122 may comprise one or more gyroscope and/or accelerometer devices that are capable of determining an orientation of the robotic cane 100 with respect to a vertical orientation, as well as an acceleration of the robotic cane 100. The balance signal 123 provided by the balance control sensor 122 corresponds to an orientation angle $\theta$ between a central axis of the robotic cane 100 and a vertical orientation, as well as an offset horizontal distance d along the support surface 170 from the central axis of the robotic cane 100 to the rotational axis of the omni-directional wheel. For example, the balance signal 123 provides information relating to a direction and acceleration in which the robotic cane 100 may be tipping over, or information relating to a user's weight shift and desired direction and speed of travel.

In embodiments utilizing an omni-directional wheel 134, the controller module 160 may have an inverted pendulum control algorithm stored in the memory 164 to maintain the robotic cane 100 balanced in a substantially upright position during an autonomous standing operation with no user interaction, as well as provide a counter force to keep the user balanced during a user assist operation. During both the autonomous standing operation and the user assist operation, the controller module 160 maintains the robotic cane 100 in a substantially upright position. The inverted pendulum control algorithm may be based on fuzzy control logic, $H_\infty$ control logic, or any other feedback methodology to calculate a balancing velocity of the omni-directional wheel 134 to keep the robotic cane 100 in a substantially upright position. In accordance with the inverted pendulum control, the omni-directional wheel rotates to cause the robotic cane 100 to move slightly to counter a falling motion of the cane such that cane remains upright. Referring to FIG. 4, the illustrated robotic cane 100 is orientated at a relatively large orientation angle $\theta$. Using fuzzy or $H_\infty$ control logic, the controller module 160 calculates a balance velocity indicative of an angular speed and direction that the omni-directional wheel 134 should be rotated to retain the robotic cane 100 in an upright position. The drive electronics 166 of the controller module then provides one or more drive signals to the omni-directional wheel 134 so that the wheel rotates accordingly such that the wheel travels a horizontal distance d (i.e., in the right direction), thereby making the orientation angle $\theta$ and offset distance d equal to zero. Therefore, the inverted pendulum control algorithm may cause the omni-directional wheel to make continuous corrective rotations to keep the cane substantially upright without user intervention.

During a user assist mode, not only does the controller module 160 provide drive signals to the omni-directional wheel 134 to keep the robotic cane 100 upright, it causes the robotic cane 100 to support the user in a standing position or travel in a direction at a speed that matches a desired direction and speed of travel of the user. As illustrated by the generally downward arrows 150 in FIG. 1, the user may apply a generally downward force onto the robotic cane 100 at the grip handle 120 by using the robotic cane 100 to assist himself or herself to remain in a standing position or to walk to a particular destination.

The user may walk while holding the cane at the grip handle 110 so that the cane travels at the same direction and speed of the user while remaining in a substantially upright position. The balance signal 123 provided by the sensor devices of the balance control sensor 122 is indicative of a force or weight projection provided on the robotic cane 100 at the grip handle 110 by a user. The weight projection corresponds to a desired direction and speed of travel. When the user pushes the robotic cane 100 in a forward direction, the orientation angle θ will indicate to the controller module the user's weight projection that corresponds to the direction and speed in which the user wishes to walk. The controller module 160 receives the balance signal 123 and calculates the user's weight projection and determines an angular speed and direction of the omni-directional wheel 134 that will cause the robotic cane 100 to travel at the user's speed and direction. The controller module 160 then outputs a drive signal to the omni-directional wheel accordingly. By remaining in a substantially upright position while moving with the user, the robotic cane 100 provides a counter force on the grip handle 110 and supports the user while he or she walks.

In another embodiment, the intended direction and speed of travel may be provided by a force input device 126 (FIG. 5) maintained in the grip handle 110. The force input device 126 may be a multi-axis sensor that detects both magnitude and direction of a force. The force input device 126 detects the force applied to the grip handle 110 and provides a force input signal 127 to the controller module 160. The controller module 160 uses the force input signal 127 to calculate and provide a drive signal that causes the robotic cane to travel at the user's intended walking speed and direction.

The controller module 160 may also be programmed to cause the robotic cane 100 to be operated in a fall-prevention mode that quickly provides a counter force to a user's falling projection. When a user of a cane or other supporting device such as a walker is about to lose his or her balance, he or she instinctively reacts by strongly gripping the cane or walker. Embodiments may use this sudden fluctuation of a user's gripping force applied to the grip handle 110 to predict that the user is losing his or her balance and to react accordingly by switching from a user assist mode to a fall prevention mode.

The grip force sensor 120 may provide a grip force signal 121 in response to a sudden increase of force applied to the grip handle 110 by a user. The controller module 160 receives the grip force signal 121. If the grip force signal 121 is greater than a grip force threshold value, for example, the controller module 160 switches an operational control mode from the user assist mode to a fall prevention mode in accordance with the computer executable instructions stored in the memory. During the fall prevention mode, the controller module 160 may sample the balance signal 122 of the balance control sensor at an increased frequency over the sampling frequency during the user assist mode to quickly react to the potential fall of the user. The controller module 160 samples the balance signal 122 to calculate the orientation of the robotic cane as described above. The orientation of the robotic cane is indicative of the user's weight projection.

Figure 7A:
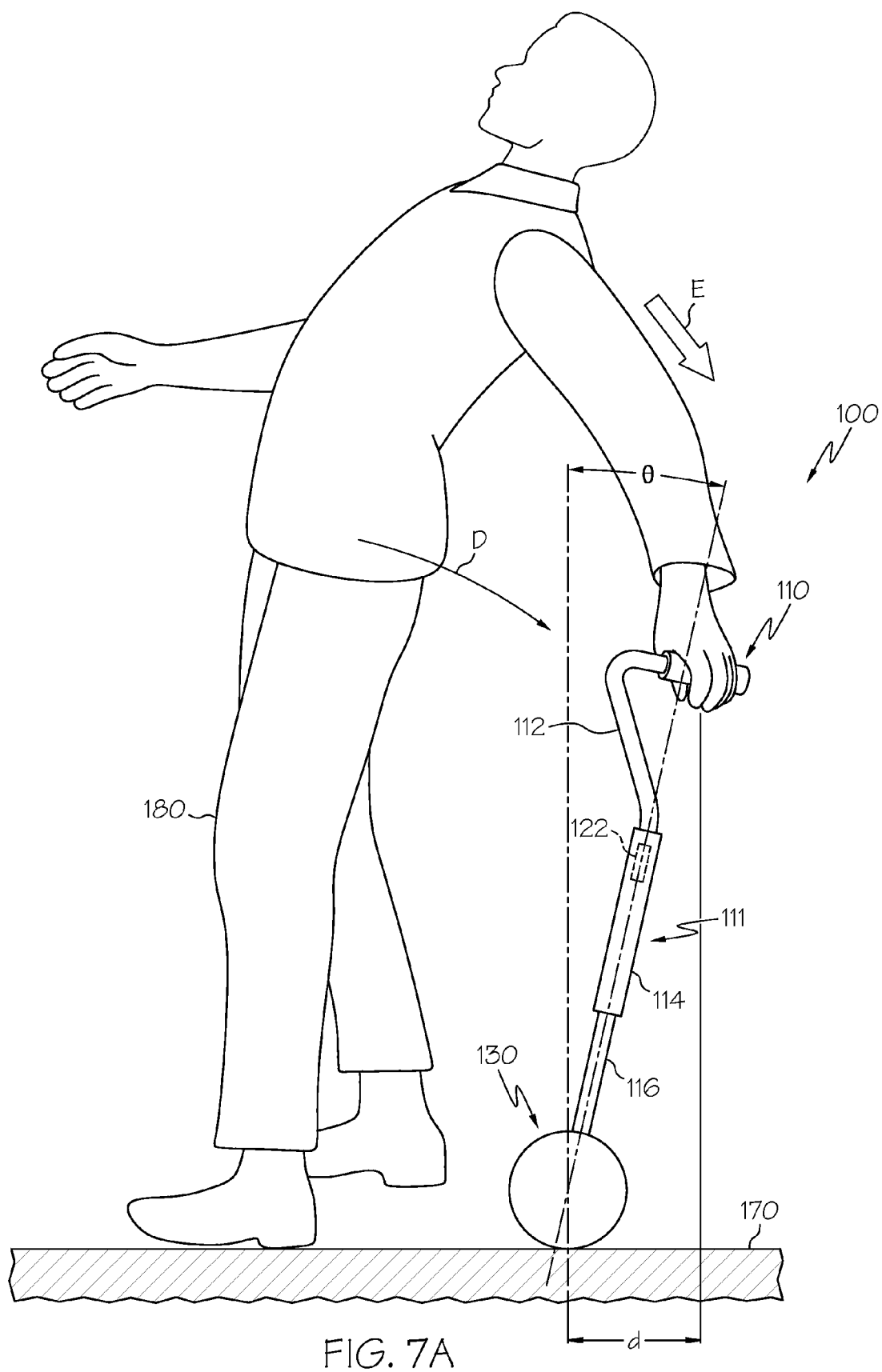
FIG. 7A depicts a user and a robotic cane in an angled orientation according to one or more embodiments shown and described herein.

Referring to FIG. 7A, a user 180 is illustrated as losing his or her balance in a direction indicated by arrow D. The user's weight projection (arrow E) during the initiation of the fall causes the robotic cane 100 to have an orientation angle of θ and a positive offset horizontal distance of d from the rotational axis of the omni-directional wheel of the motorized wheel assembly 130 to the central axis of the robotic cane 100. After switching to the fall prevention mode based on the sudden increase of the force at the grip handle, the controller module 160 determines the orientation of the robotic cane and calculates a fall prevention drive signal to be applied to the omni-directional wheel in accordance with the determined cane orientation. The fall prevention mode utilizes a feed-forward control loop (i.e., an open control loop) in addition to the feed-back control loop to quickly determine the user's weight projection and calculate the fall prevention drive signal.

Figure 7B:
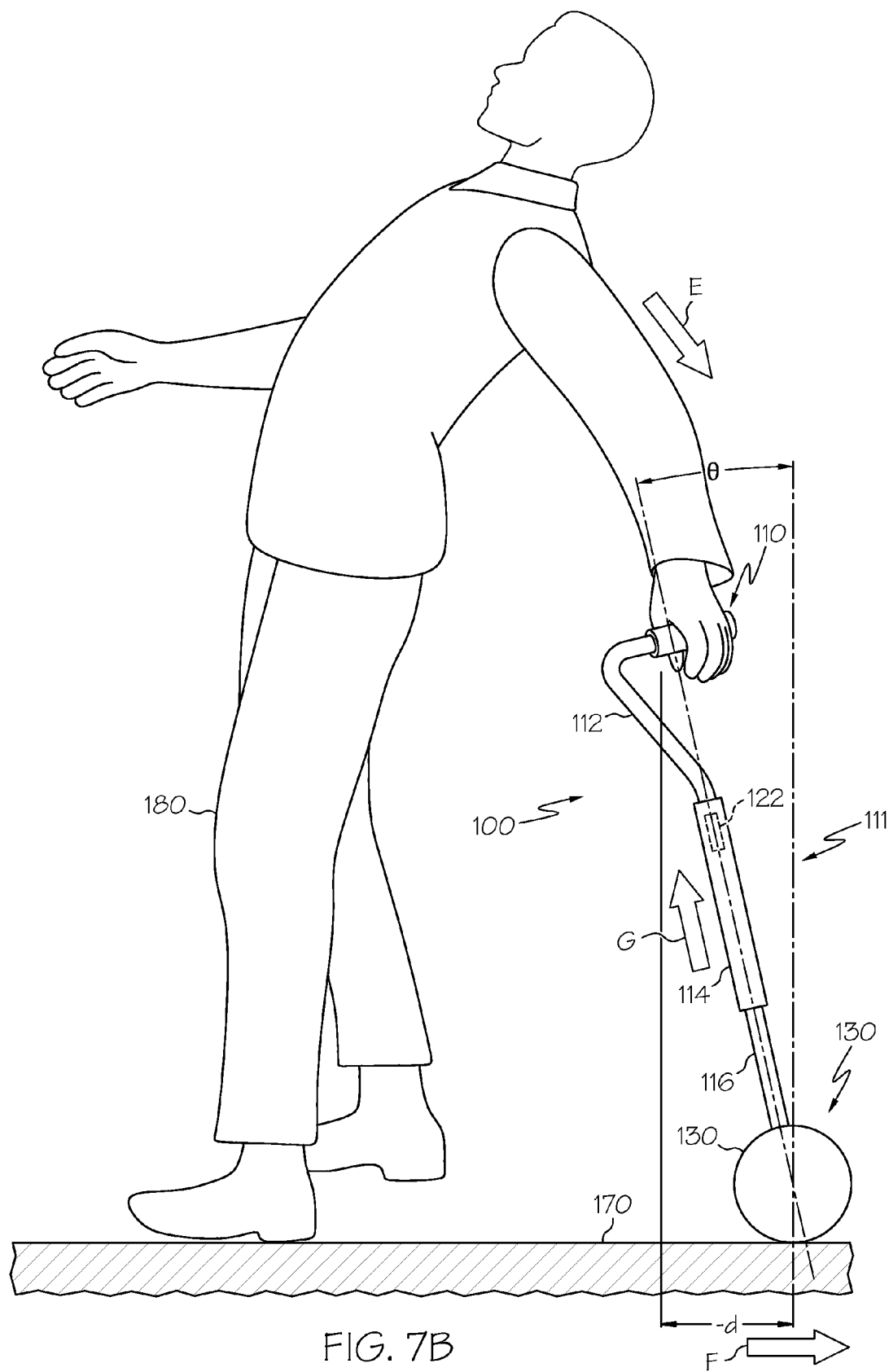
FIG. 7B depicts a user and a robotic cane operating in a fall prevention mode according to one or more embodiments shown and described herein.

Rather than applying a drive signal to the motorize wheel assembly 130 to cause the robotic cane 100 to return to an upright position as described above with respect to the user assist mode, the fall prevention drive signal causes the robotic cane 100 to be oriented at an angle that provides a counter force to a user's weight projection during a fall such that the robotic cane 100 may support the user. Referring now to FIG. 7B, an orientation of the robotic cane 100 to support a user 180 during a fall depicted in FIG. 7A is illustrated. The fall prevention drive signal causes the robotic cane 100 to quickly translate in the direction indicated by arrow F at a distance that is greater than the offset distance d, such that the robotic cane moves past a position corresponding to a substantially upright position. The robotic cane 100 translates such that there is a negative distance −d from the rotational axis of the omni-directional wheel of the motorized wheel assembly 130 to the central axis of the robotic cane 100. Therefore, the fall prevention drive signal causes the robotic cane 100 to be orientated at an orientation angle −θ that is opposite from the orientation angle θ provided by the weight projections of the user. This orientation of the robotic cane provides a counter force indicated by arrow G to the weight projection E. In this manner, the robotic cane may support the user during the first moments of a potential fall. The user may then regain his or her balance and return to a stable standing position and relax his or her gripping force on the grip handle 110. The controller module 160 continues to monitor the grip force signal 121 and the balance signal 123 to determine that the user is stable and then switch from the fall prevention mode back to the user assist mode.

Embodiments may also be operated in a user tracking mode wherein the robotic cane 100 is programmed to follow the user at a particular distance, which may be programmable by the user. The distance may be programmed by using an input device on the robotic cane 100 or by using a computer that is communicably coupled to the robotic cane. The ability of the robotic cane 100 to follow the user may be advantageous in physical therapy or rehabilitation sessions where the user is trying to walk on his or her own but still requires a cane nearby in case he or she falters and needs to grab onto the cane for assistance. Similarly, the user tracking mode may be used by disabled or elderly persons so that they may still feel independent in walking without assistance.

The robotic cane 100 may be equipped with a proximity detector 124 that provides a proximity signal 125 corresponding to a distance between the robotic cane 100 and the user to the controller module 160. The controller module 160 may be programmed to receive and use the proximity signal 125 to calculate the drive signal 163 such that the robotic cane 100 remains in a substantially upright position and autonomously follows the user at the predetermined distance.

The proximity detector may take a variety of forms. In one embodiment, the proximity detector is an RFID tag reader device positioned on the cane body 111 that communicates with an RFID tag associated with the user. The RFID reader device or the controller module 160 may determine a position of the user with respect to the robotic cane based on the RF signal communicated between the RFID reader device and RFID tag. In another embodiment, the proximity detector 123 is configured as one or more infrared distance sensors positioned on the cane body 111 that detect a distance between the robotic cane and the user. The infrared distance sensor or sensors may then provide a proximity signal or signals to controller module. Other proximity detector devices may also be used. For example, a wireless communications device may be associated with the user that broadcasts a wireless beacon signal that is received by a wireless receiver on the robotic cane. The wireless receiver or the controller module may determine a position of the user with respect to the robotic cane based on the received wireless beacon signal.

Some embodiments may be equipped with a user identification device such that the robotic cane may only be operated by registered users. The user identification device may be a numeric or alpha-numeric pad, a fingerprint verification device, or a face recognition device. Once a user's identity is verified, the robotic cane 100 may be automatically configured according to one or more user parameters. For example, a length of the cane body 111 may be automatically adjusted such that the robotic cane 100 is at a proper height for the particular registered user. Other parameters may be set, such as maximum speed for the particular user and disabled fall prevention mode, for example.

It should now be understood that the embodiments of the robotic cane described herein may be used to provide assistance in walking and standing to a user. For example, in one embodiment a robotic cane comprises a motorized wheel assembly having a single omni-directional wheel that is driven to remain in a substantially upright position and travel in a direction and at a speed corresponding to the walking motion of a user. Embodiments may also quickly be oriented to provide a counter force in response to a user starting to fall. A tracking mode may also be provided such that the robotic cane follows a user at a predetermined distance.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic cane comprising:
a grip handle;
a cane body extending from the grip handle at a first end of the cane body;
a motorized wheel assembly comprising at least one wheel coupled to a second end of the cane body;
a proximity detector, wherein the proximity detector provides a proximity signal corresponding to a position of a user with respect to the robotic cane; and
a controller module, wherein the controller module is programmed to:
receive the proximity signal from the proximity detector;
calculate a distance of the robotic cane from the user based at least in part on the proximity signal; and
provide a drive signal to the motorized wheel assembly such that the robotic cane follows the user without user contact at a predetermined distance, such that the grip handle is within a reach of the user.

2. The robotic cane of claim 1, wherein the proximity detector comprises an RFID tag reader operable to read an RFID tag associated with the user and indicate the position of the user with respect to the robotic cane.

3. The robotic cane of claim 1, further comprising a force input device, wherein the force input device provides a force signal corresponding to a magnitude and a direction of a force applied to the grip handle during an assist mode and the controller module:
receives the force signal from the force input device;
calculates a user velocity based at least in part on the force signal; and
provides a drive signal to the motorized wheel assembly in accordance with the calculated user velocity such that the robotic cane travels at substantially a desired user direction and a speed of travel while the robotic cane is operating in the assist mode.

4. The robotic cane of claim 1, further comprising a balance control sensor, wherein:
the balance control sensor provides a balance signal corresponding to an orientation of the robotic cane;
the motorized wheel assembly comprises an omni-directional wheel; and
the controller module receives the balance signal from the balance control sensor and provides a drive signal to the motorized wheel assembly in accordance with the balance signal and an inverted pendulum control algorithm such that the robotic cane remains in an upright position.

5. The robotic cane of claim 1, wherein the proximity detector comprises an infrared distance sensor positioned on the cane body and configured to detect a distance between the robotic cane and the user.

6. The robotic cane of claim 1, wherein the proximity detector comprises a wireless communications device operable to detect a wireless beacon signal that is broadcast from a wireless communications device associated with the user.

7. The robotic cane of claim 1, wherein a length of the cane body automatically adjusts to a proper height for the user.

8. The robotic cane of claim 1, further comprising a user identification device, wherein the user identification device is a fingerprint verification device or a face recognition device.

9. The robotic cane of claim 1, further comprising a plurality of retractable auxiliary supports, wherein the retractable auxiliary supports are in an engaged position when the robotic cane is operated in a supported mode such that the retractable auxiliary supports engage a supporting surface, and the retractable auxiliary supports are in an unengaged position when the robotic cane is operated in an unsupported mode such that the retractable auxiliary supports are disengaged from the supporting surface.

10. The robotic cane of claim 1, wherein the motorized wheel assembly comprises an omni-directional wheel.

11. A robotic cane comprising:
a grip handle;
a cane body extending from the grip handle at a first end of the cane body;
a motorized wheel assembly comprising at least one wheel coupled to a second end of the cane body;
a user identification device for registering a registered user of the robotic cane;
a proximity detector, wherein the proximity detector provides a proximity signal corresponding to a position of the registered user with respect to the robotic cane;
a controller module, wherein the controller module is programmed to:

receive the proximity signal from the proximity detector;

calculate a distance of the robotic cane from the registered user based at least in part on the proximity signal; and provide a drive signal to the motorized wheel assembly such that the robotic cane autonomously follows the registered user without user contact at a predetermined distance, such that the grip handle is within a reach of the registered user.

12. The robotic cane of claim 11, wherein the proximity detector comprises an RFID tag reader operable to read an RFID tag associated with the registered user and indicate the position of the registered user with respect to the robotic cane.

13. The robotic cane of claim 12, further comprising a force input device, wherein the force input device provides a force signal corresponding to a magnitude and a direction of a force applied to the grip handle during an assist mode and the controller module:

receives the force signal from the force input device;

calculates a user velocity based at least in part on the force signal; and provides a drive signal to the motorized wheel assembly in accordance with the calculated user velocity such that the robotic cane travels at substantially a desired user direction and a speed of travel while the robotic cane is operating in the assist mode.

14. The robotic cane of claim 11, further comprising a balance control sensor, wherein:

the balance control sensor provides a balance signal corresponding to an orientation of the robotic cane;

the motorized wheel assembly comprises an omni-directional wheel; and the controller module receives the balance signal from the balance control sensor and provides a drive signal to the motorized wheel assembly in accordance with the balance signal and an inverted pendulum control algorithm such that the robotic cane remains in an upright position.

15. The robotic cane of claim 11, wherein the proximity detector comprises an infrared distance sensor positioned on the cane body and configured to detect a distance between the robotic cane and the registered user.

16. The robotic cane of claim 11, wherein the proximity detector comprises a wireless communications device operable to detect a wireless beacon signal that is broadcast from a wireless communications device associated with the registered user.

17. The robotic cane of claim 11, wherein a length of the cane body automatically adjusts to a proper height for the registered user.

18. The robotic cane of claim 11, wherein the user identification device is a numeric pad or an alpha-numeric pad.

19. The robotic cane of claim 11, further comprising a plurality of retractable auxiliary supports, wherein the retractable auxiliary supports are in an engaged position when the robotic cane is operated in a supported mode such that the retractable auxiliary supports engage a supporting surface, and the retractable auxiliary supports are in an unengaged position when the robotic cane is operated in an unsupported mode such that the retractable auxiliary supports are disengaged from the supporting surface.

20. The robotic cane of claim 11, wherein the motorized wheel assembly comprises an omni-directional wheel.

* * * * *